(12) United States Patent
Holstein et al.

(10) Patent No.: US 8,692,403 B2
(45) Date of Patent: Apr. 8, 2014

(54) SUBMARINE POWER STATION AND ASSEMBLY THEREOF

(75) Inventors: Benjamin Holstein, Heidenheim (DE); Norman Perner, Neu-Ulm (DE)

(73) Assignee: Voith Patent GmbH, Heidenheim (DE)

( * ) Notice: Subject to any disclaimer, the term of this patent is extended or adjusted under 35 U.S.C. 154(b) by 428 days.

(21) Appl. No.: 12/737,270

(22) PCT Filed: Jul. 3, 2009

(86) PCT No.: PCT/EP2009/004855
§ 371 (c)(1),
(2), (4) Date: Mar. 18, 2011

(87) PCT Pub. No.: WO2010/003604
PCT Pub. Date: Jan. 14, 2010

(65) Prior Publication Data
US 2011/0170954 A1    Jul. 14, 2011

(30) Foreign Application Priority Data
Jul. 7, 2008    (DE) .......................... 10 2008 031 615

(51) Int. Cl.
*F03B 13/00* (2006.01)

(52) U.S. Cl.
USPC .......................................................... 290/54

(58) Field of Classification Search
USPC .................... 290/43, 54; 415/3.1, 2.1, 42, 53; 60/398, 698
See application file for complete search history.

(56) References Cited

U.S. PATENT DOCUMENTS

| | | | |
|---|---|---|---|
| 4,445,046 A * | 4/1984 | Allegre et al. | 290/52 |
| 5,252,875 A * | 10/1993 | Veronesi et al. | 310/114 |
| 7,102,249 B2 * | 9/2006 | Wobben | 290/54 |
| 7,235,894 B2 * | 6/2007 | Roos | 290/54 |
| 7,385,303 B2 * | 6/2008 | Roos | 290/54 |
| 8,294,290 B2 * | 10/2012 | da Silva | 290/52 |
| 2002/0117861 A1 * | 8/2002 | Kim et al. | 290/54 |
| 2003/0193198 A1 * | 10/2003 | Wobben | 290/54 |
| 2007/0007857 A1 * | 1/2007 | Cullen et al. | 310/323.04 |
| 2007/0075548 A1 * | 4/2007 | Bagepalli et al. | 290/55 |
| 2010/0066089 A1 * | 3/2010 | Best et al. | 290/52 |
| 2010/0295309 A1 * | 11/2010 | Holstein et al. | 290/52 |
| 2011/0057442 A1 * | 3/2011 | Chauvin | 290/43 |
| 2012/0013129 A1 * | 1/2012 | Cornelius et al. | 290/54 |
| 2012/0175881 A1 * | 7/2012 | Rosefsky | 290/54 |
| 2012/0228878 A1 * | 9/2012 | Perner et al. | 290/54 |

FOREIGN PATENT DOCUMENTS

| | | |
|---|---|---|
| DE | 32 23 668 A1 | 2/1983 |
| GB | 2 431 628 A | 5/2007 |
| WO | WO 2007/017629 A1 | 2/2007 |
| WO | WO 2007/125349 A2 | 11/2007 |

* cited by examiner

*Primary Examiner* — Tulsidas C Patel
*Assistant Examiner* — Viet Nguyen
(74) *Attorney, Agent, or Firm* — Farjami & Farjami LLP

(57) ABSTRACT

An installation method for an underwater power plant includes a nacelle comprising a nacelle housing having a first nacelle housing section, a water turbine including a drive connection to a drive shaft, the drive shaft being mounted inside the first nacelle housing section, an electrical generator, comprising a generator rotor and a generator stator, and a generator housing. The electrical generator and the generator housing from a separate generator module that can be handled and installed as a whole, and an adjustment of bearings for the drive shaft is executed before a production of a coupling between the generator module and the drive shaft, and the generator housing is coupled in a rotationally-fixed manner to the first nacelle housing section and the generator is coupled in a rotationally-fixed manner to the drive shaft, the generator rotor being carried by the drive shaft after the coupling.

20 Claims, 2 Drawing Sheets

SUBMARINE POWER STATION AND ASSEMBLY THEREOF

This is a U.S. national phase application which is based on, and claims priority from, PCT application Serial No. PCT/EP2009/004855, filed Jul. 3, 2009, which claims priority from foreign application Serial No. 102008031615.6, filed Jul. 7, 2008, in Germany.

The invention relates to an underwater power plant, in particular a tidal power plant, and a method for the installation thereof.

Freestanding underwater power plants in a water current, in particular for generating energy from a tidal current, are known. A typical construction comprises a propeller-shaped water turbine which revolves on a nacelle. The nacelle is carried by a support structure, which has a foundation on the floor of the body of water, or is held at a predetermined submersion depth as a floating unit by an anchor. For a sufficiently large implementation of such underwater power plants, relatively slow currents may already be exploited to obtain energy. An electrical generator is typically provided for this purpose in the nacelle, which is at least indirectly driven by the water turbine.

In order to be able to dispense with a transmission, which is susceptible to maintenance, in the drivetrain of the underwater power plant, directly driven electrical generators have been proposed, the slow running of the generator rotor resulting therefrom being compensated for by its multipole implementation. The electrical generators which result from this approach for an underwater power plant according to the species have a large construction and are heavy, however. This results in a high installation effort, in particular for installation on location on board a water vehicle at the installation location of the plant.

Furthermore, high-performance permanent magnets are used to implement the multipole generator rotor, so that the necessity exists of providing a permanent magnet safeguard for the transport and handling of a generator rotor. In addition, a plant concept having a watertight encapsulated electrical generator having a surrounding housing and a shaft seal make the installation more difficult.

Reference is made, for example, to WO 2007/125349 A2 and WO 2007/017629 A1 for the above-described plant concept. A shaft mounting is disclosed in these publications, which is situated on both sides of the electrical generator viewed in the axial direction. For such a design, the bearing alignment is typically performed having a generator rotor placed on the drive shaft. The intrinsic weight of the electrical generator is cumbersome during the bearing adjustment. Furthermore, in particular in the case of a generator rotor implementation having permanent magnets, undesired magnetic forces may have an interfering influence on the centering of the components to be mounted and the bearing alignment.

SUMMARY

The invention is based on the object of implementing an underwater power plant according to the species in such a way that its installation is improved with respect to the transport and the handling ability of individual components, and the assembly and the alignment, in particular the bearing alignment, of the plant components is simplified.

The object on which the invention is based is achieved by the features of the independent claims.

For an underwater power plant according to the invention, a generator module which can be handled as a whole and installed as a unit is provided. It comprises, with the generator rotor and the generator stator, the basic components of the electrical generator. In addition, a generator housing is part of the generator module. For an advantageous design, the control and power components of the electrical generator may be additionally accommodated in the generator module. For a further preferred embodiment, devices for cooling the generator components are provided in the generator module.

The generator module is preferably provided with a transport safeguard for the transport and the mounting, which both secures the relative location of the preferably pre-centered generator components and also causes the protection of permanent magnets. In particular, an element which engages in the air gap between the generator rotor and the generator stator is provided for the transport safeguard. Additional protection is caused by the at least partial enclosure of the components of the generator stator and the generator rotor by the generator housing.

In order to install the generator module as a coherent unit, connection means are provided for coupling the generator rotor on a drive shaft of the underwater power plant and for coupling the generator housing on an adjoining nacelle housing section. Furthermore, the underwater power plant is preferably laid out in such a way that the generator module axially adjoins the drive shaft. Accordingly, the drive shaft is implemented in one piece for a preferred embodiment. A rotationally-fixed connection to the water turbine is produced on the input side and a corresponding rotationally-fixed connection to the generator rotor is produced on the output side. After the generator module is coupled on, it is supported against the adjacent sections of the nacelle housing.

For an alternative embodiment, the drive shaft can be implemented as divided, i.e., in two parts. For such a design, the generator module can be inserted between two shaft parts. A continuous shaft drive arises through the production of the rotationally-fixed connection of the generator rotor of the generator module to the two shaft parts on both sides. Correspondingly, a mounting for the drive shaft can be provided axially on both sides of the generator rotor for this embodiment.

For an advantageous embodiment of the invention, volume areas which generate buoyancy are provided within the drive shaft for balancing of the revolving unit. These may be separate buoyant bodies or closed sections or sections which are filled with a light, floating material. The buoyancy point relative to the center of gravity of the revolving unit is adjusted by the buoyancy forces resulting therefrom, so that the bearings may be relieved or intentionally pre-tensioned.

For a refinement, a buoyant volume is also assigned for the generator module in the installed state. For this purpose, a buoyant element or a seal volume section is enclosed by the generator rotor, which is used for the purpose of reducing its gravity and the torques resulting therefrom, which are introduced into the drive shaft and its mounting, or adjusting it in a defined manner. For a possible embodiment, the separate buoyant volume which is assigned to the generator module results through the closure of a passage opening, which is placed centrally in the generator rotor, in order to allow installation access for attaching the connection means to the drive shaft. After the execution of the coupling of the generator rotor of the generator module on the drive shaft, this passage opening can be closed liquid-tight to implement the desired buoyant volume.

The advantages which result from a separator generator module are, on the one hand, the simplified handling of the generator components, including dispensing with a separate permanent magnet safeguard, on the other hand, the installation is made easier in that the installation step of coupling on the generator module is preceded by the initial alignment of the mounting of the drive shaft. As described above, without the generator components, the basic adjustment of the mounting can be simplified because of the smaller bearing pressure forces, which result from the lower weight and the omission of magnetic force actions without the generator components.

BRIEF DESCRIPTION OF THE DRAWINGS

The invention is explained in greater detail hereafter on the basis of an exemplary embodiment in connection with illustrations in the figures. In the detailed figures.

DETAILED DESCRIPTION

Figure 1:
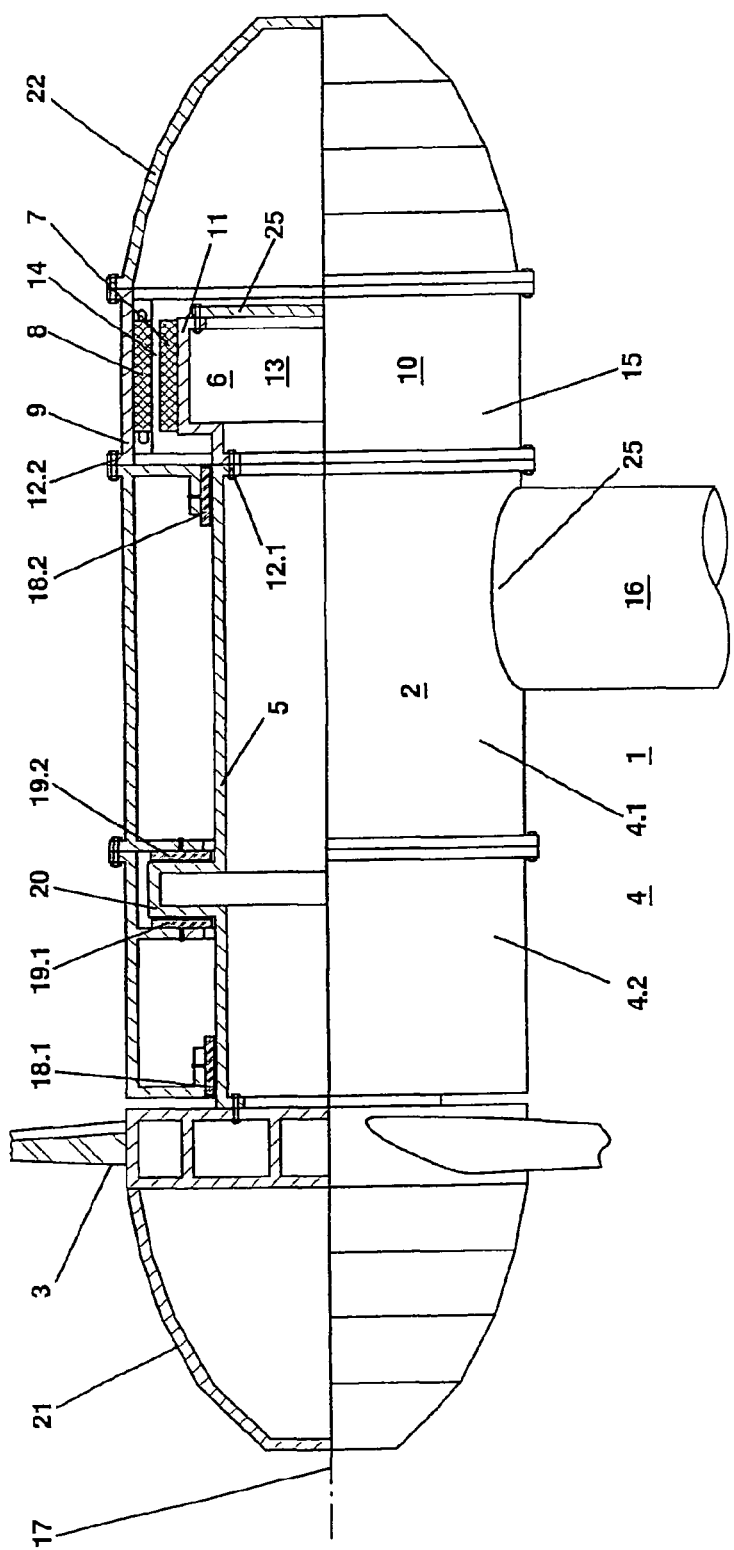
FIG. 1 shows an underwater power plant according to the invention in an axial partial section.

An exemplary embodiment of an underwater power plant according to the invention is outlined in schematically simplified form in FIG. 1. In the present case, a nacelle 1 having segmented construction is used, which is used to accommodate the drivetrain and the electric generator 6. According to the invention, the components of the electric generator 6, in particular the generator rotor 7 and the generator stator 8, are combined to form a generator module 10, which also comprises the generator housing 9. The generator module 10 can be handled as a whole and can be installed as a complete unit.

A further basic component of the underwater power plant is the water turbine 3, which is laid out in the form of a rotor for the present design. The water turbine 3 is at least indirectly connected to a drive shaft 5, the drive shaft 5 being mounted inside a first nacelle housing section 4. For the illustrated embodiment, water-lubricated friction bearings are provided, which are laid out in the present case as radial bearings 18.1, 18.2 and as axial bearings 19.1, 19.2. For a preferred embodiment, the drive shaft 5 is supported bidirectionally in the axial direction against the axial bearings 19.1, 19.2 using a spur ring 20. Furthermore, the water turbine 3 is connected rotationally-fixed to the drive shaft 5 for the illustrated exemplary embodiment, so that the water turbine 3 is carried by the drive shaft 5 and forms a revolving unit together with a water-turbine-side hood 21.

For the transport of individual components of the underwater power plant to the installation location, one advantage of a separate generator module 10 results in that in particular if permanent magnets are used to implement the generator rotor, no additional permanent magnet protection is to be provided. Instead, the generator rotor is situated inside the generator stator 8 in accordance with its later operating position and is additionally radially externally enclosed by the generator housing 9. Accordingly, a simple transport safeguard 23, which is explained in greater detail hereafter in connection with the installation method according to the invention, is sufficient for the secure transport of the electric generator 6.

A further advantage of a separator generator module 10 may be seen in that the mounting of the drive shaft 5, for the present exemplary embodiment the radial bearings 18.1, 18.2 and the axial bearings 19.1, 19.2, can be adjusted before the installation of the generator module 10. In this way, the basic alignment of the mounting is simplified, since no additional forces which result from the intrinsic weight of the generator rotor are introduced into the bearing. In addition, the magnetic forces are initially omitted, which are relevant in the case of implementation of a generator rotor having permanent magnets. Correspondingly, the centering of the generator rotor and generator stator can be implemented separately from the drive shaft on a device suitable for this purpose. The generator module 10 can then be fixed using the transport safeguard 23 in these pre-centered location, so that coupling on the generator module 10 and producing the connection of the generator rotor 7 and the generator stator 8 to the adjoining plant components are simplified.

Figure 2:
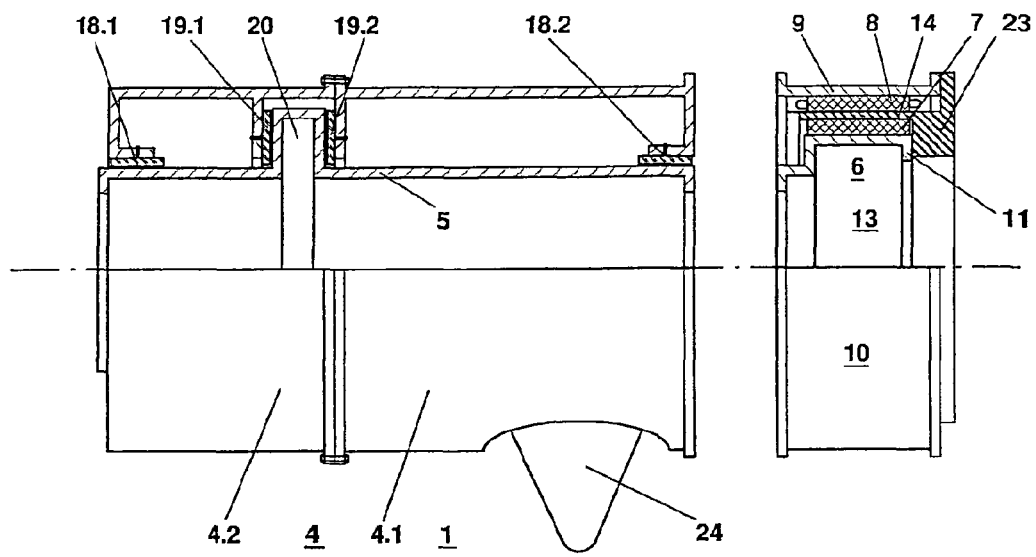
FIG. 2 shows a generator module before being coupled on for an embodiment according to FIG. 1.

The method according to the invention comprises a first alignment of the mounting of the drive shaft 5 within the first nacelle housing section 4 before the attachment of the generator module 10, which is to be handled and installed as a whole. FIG. 2 shows the installation state before the generator module is coupled on. It is obvious that the first nacelle housing section 4 having the drive shaft 5 accommodated therein is initially constructed. According to an advantageous embodiment, for this purpose the drive shaft 5 is first inserted into a first segment 4.1 of the first nacelle housing section 4. The spur ring 20 comes into contact with the bearing bodies which form the axial bearing 19.2. Furthermore, a first radial centering is advantageously initially performed using the radial bearing 18.2. The second segment 4.2 of the first nacelle housing section 4 is then put on, so that the spur ring 20 is supported on both sides by the axial bearings 19.1 and 19.2 and a radial support occurs in at least one further area along the drive shaft—in the present case by the radial bearing 18.1.

The above-described installation sequence, before the coupling of the generator module 10 can include the attachment of the water turbine 3. This variant is not shown in FIG. 2. However, it is conceivable to execute the initial bearing alignment without the generator module 10 having the entire further revolving unit including the water turbine 3 and the water-turbine-side hood 21.

The generator module 10 which is provided for installation has a transport safeguard 23 in FIG. 2. It radially secures the generator rotor 7 by a part interposed in the air gap 14. In addition, the generator rotor 7 is captively retained by the transport safeguard 23 in the axial direction. Correspondingly, the generator module 10 can be placed using a suitable crane or lift system as a monolithic module in a pre-centered manner on the drive shaft 5, which is basically aligned in the first nacelle housing section 4. A connection is then produced by the connection means 12.1 between the carrying body 11 of the generator rotor 7 and the drive shaft 5. A corresponding connection is performed via the connection means 12.2 between the generator housing 9 and the first nacelle housing section 4. As a result, the generator rotor 7 axially adjoins the drive shaft 5.

After the generator module 10 has been coupled on, the transport safeguard 23 can be removed and the generator rotor 7 is carried by the drive shaft 5 after being coupled thereto. A bearing alignment is then advantageously executed once again, which is simplified because of the preceding basic alignment of the mounting for the drive shaft 5, however. Correspondingly, a re-centering of the generator stator 8 relative to the generator rotor 7 on the generator housing 9 or a carrying structure (not shown in detail) can be performed for the generator stator 8.

For the illustrated exemplary embodiment, after the generator module 10 is coupled on, the generator-side hood 22 is installed. Furthermore, the water turbine 3 is placed on the drive shaft and fastened. The access to the fastening elements for the water turbine 3 on the drive shaft 5 is preferably located centrally in the area of the hub of the water turbine.

Figure 3:
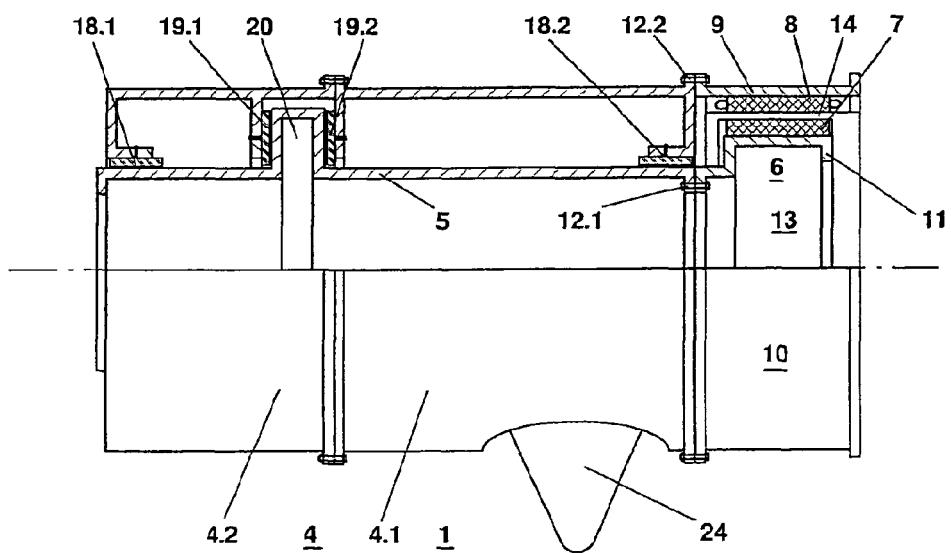
FIG. 3 shows the state after the generator module is coupled on for an embodiment according to FIG. 1.

The access openings required for this purpose in the hub of the water turbine are not shown in detail in the figures. In a further installation step, the water-turbine-side hood 21 is attached, whereby the nacelle 1 is completed and can be sunk to a support structure on the floor of the body of water. For insertion into a fastening device on the support structure, a centering device 24 can be provided on the nacelle 1, which is outlined in FIGS. 2 and 3. The nacelle 1 is preferably fastened on the support structure in such a way that the generator module and the water turbine are situated on opposing sides in relation to the fastening on the support structure, in order to keep the torque introduced onto the fastening on the support structure small using the most uniform possible weight distribution.

A passage opening 13 is preferably located centrally in the generator module 10. In this way, the connection means 12.1 for coupling the carrying body 11 of the generator rotor 7 on the drive shaft 5 are accessible. In the simplest case, a plurality of screw connections is selected as the connection means 12.1 for the coupling, which connect flanges, which face inward, on the drive shaft 5 and the carrying body 11 to one another in a rotationally-fixed manner. The passage opening 13 can be closed after the generator module 10 is coupled on, in order to provide a watertight cavity, which is delimited by the generator rotor 7 and acts as a buoyant volume. In FIG. 1, a cover 25 used for this purpose is outlined. In this way, in the immersed state of the plant, the weight force of the generator rotor 7 is completely or partially compensated for, in order to reduce static bearing pressure forces.

For the illustrated exemplary embodiment, the generator housing 9 of the generator module 10 represents a part of the nacelle housing 2 after the installation, which has flow around it during operation. Accordingly, the generator module 10 forms a second nacelle housing section 15 of the nacelle 1. Furthermore, alternative embodiments are conceivable, for which the generator module 10 is situated inside the first nacelle housing section 4 after the installation. For such an embodiment, which is not shown in detail in the figures, the design of the outer wall of the nacelle housing 2 for favorable flow can be can be laid out differently from the cylindrical shape which is used for a simple generator module. Embodiment alternatives relate to plant concepts having a generator module 10 which has a generator rotor 7 in the form of an external rotor. For this case, the drive shaft 5 is also implemented externally rotating as a hollow shaft, whose mounting is preferably supported radially inward against the nacelle housing 2. Such an embodiment is not shown in detail in the illustrations of the figures.

Furthermore, it is possible to accommodate an encapsulated volume area for electrical control components inside the generator module 10. This relates in particular to the power electronics, which are assigned to the electrical generator 6. In addition, cooling devices for the generator components may be accommodated in the generator module.

For a particularly preferred embodiment, the electrical generator 6 is implemented so water washes around it. In particular, the air gap 14 between the generator rotor 7 and the generator stator 8 is flooded and the electrical conductors in the generator stator 8 are separated from the water-flooded area by grouting or by an envelope in the meaning of a split tube. Furthermore, a hydraulic connection preferably exists after the installation between the flooded areas inside the first nacelle housing section 4, having the water-lubricated radial bearings 18.1, 18.2 and axial bearings 19.1, 19.2 located therein, and the water guiding in the air gap 14 of the electrical generator 6. Accordingly, the generator module 10 used according to the invention is designed as open on at least one side.

LIST OF REFERENCE NUMERALS

1 nacelle
2 nacelle housing
3 water turbine
4 first nacelle housing section
4.1, 4.2 segment
5 drive shaft
6 electrical generator
7 generator rotor
8 generator stator
9 generator housing
10 generator module
11 carrying body
12.1, 12.2 connection means
13 passage opening
14 air gap
15 second nacelle housing section
16 support structure
17 rotational axis
18.1, 18.2 radial bearings
19.1, 19.2 axial bearings
20 spur ring
21 water-turbine-side hood
22 generator-side hood
23 transport safeguard
24 centering device
25 cover

The invention claimed is:

1. An installation method for an underwater power plant having:
   a nacelle comprising a nacelle housing having a first nacelle housing section with bearings;
   a water turbine including a drive connection to a drive shaft, the drive shaft being mounted inside the first nacelle housing section and the drive shaft is carried by the bearings;
   an electrical generator, comprising a generator rotor and a generator stator; and
   a generator housing;
   wherein the electrical generator and the generator housing form a separate generator module that is handled and installed as a whole, and
   wherein an adjustment of the bearings within the first nacelle housing section for the drive shaft is executed before a production of a coupling between the generator module and the drive shaft, and
   wherein the generator housing of the generator module is coupled in a rotationally-fixed manner to the first nacelle housing section and the generator rotor is coupled in a rotationally-fixed manner to the drive shaft, wherein the generator rotor is carried by the drive shaft after the coupling such that the bearings within the first nacelle housing section are the only bearings of the generator rotor.

2. The installation method according to claim 1, wherein the generator module is provided with a transport safeguard for the generator rotor until the coupling of the generator module.

3. The installation method according to claim 1, wherein a realignment of the bearings of the drive shaft is performed after the coupling of the generator module.

4. The installation method according to claim 2, wherein a realignment of the bearings of the drive shaft is performed after the coupling of the generator module.

5. The installation method according to claim 1, wherein the generator module is coupled axially onto the drive shaft in relation to a rotational axis of the drive shaft.

6. The installation method according to claim 2, wherein the generator module is coupled axially onto the drive shaft in relation to a rotational axis of the drive shaft.

7. The installation method according to claim 3, wherein the generator module is coupled axially onto the drive shaft in relation to a rotational axis of the drive shaft.

8. The installation method according to claim 4, wherein the generator module is coupled axially onto the drive shaft in relation to a rotational axis of the drive shaft.

9. The installation method according to claim 1, wherein a connection means for coupling the generator rotor to the drive shaft are accessible via a passage opening located centrally in the generator module.

10. The installation method according to claim 2, wherein a connection means for coupling the generator rotor to the drive shall are accessible via a passage opening located centrally in the generator module.

11. The installation method according to claim 1, wherein an air gap between the generator rotor and the generator stator is flooded.

12. The installation method according to claim 2, wherein an air gap between the generator rotor and the generator stator is flooded.

13. The installation method according to claim 1, wherein at least one of a buoyant body and a liquid-tight encapsulated buoyant volume is assigned to at least one of the drive shaft and the generator rotor.

14. The installation method according to claim 2, wherein at least one of a buoyant body and a liquid-tight encapsulated buoyant volume is assigned to at least one of the drive shaft and the generator rotor.

15. The installation method according to claim 1, wherein the generator housing forms a second nacelle housing section, wherein a flow is around the second nacelle housing section in operation of the underwater power plant, after the coupling of the generator module.

16. The installation method according to claim 2, wherein the generator housing forms a second nacelle housing section, wherein a flow is around the second nacelle housing section in operation of the underwater power plant, after the coupling of the generator module.

17. The installation method according to claim 1, wherein the water turbine and the drive shaft are connected to form a detachable revolving unit that is connectable in a rotationally-fixed manner.

18. The installation method according to claim 2, wherein the water turbine and the drive shaft are connected to form a detachable revolving unit that is connectable in a rotationally-fixed manner.

19. The installation method according to claim 1, wherein the nacelle housing is fastened on a support structure and the generator module and the water turbine are situated on opposing sides in relation to the fastening on the support structure.

20. The installation method according to claim 2, wherein the nacelle housing is fastened on a support structure and the generator module and the water turbine are situated on opposing sides in relation to the fastening on the support structure.

* * * * *

UNITED STATES PATENT AND TRADEMARK OFFICE
CERTIFICATE OF CORRECTION

| | | |
|---|---|---|
| PATENT NO. | : 8,692,403 B2 | Page 1 of 1 |
| APPLICATION NO. | : 12/737270 | |
| DATED | : April 8, 2014 | |
| INVENTOR(S) | : Holstein et al. | |

It is certified that error appears in the above-identified patent and that said Letters Patent is hereby corrected as shown below:

In the claims,

Column 7, line 21, "drive shall" should be changed to --drive shaft--.

Signed and Sealed this
Eleventh Day of November, 2014

Michelle K. Lee
*Deputy Director of the United States Patent and Trademark Office*